(12) United States Patent
Hino et al.

(10) Patent No.: US 7,972,065 B2
(45) Date of Patent: *Jul. 5, 2011

(54) HYDRODYNAMIC BEARING DEVICE, SPINDLE MOTOR, AND RECORDING AND REPRODUCING APPARATUS EQUIPPED WITH SAME

(75) Inventors: Toshifumi Hino, Ehime (JP); Nobuhiko Sato, Ehime (JP)

(73) Assignee: Panasonic Corporation, Osaka (JP)

( * ) Notice: Subject to any disclaimer, the term of this patent is extended or adjusted under 35 U.S.C. 154(b) by 599 days.

This patent is subject to a terminal disclaimer.

(21) Appl. No.: 12/128,447

(22) Filed: May 28, 2008

(65) Prior Publication Data

US 2008/0298731 A1   Dec. 4, 2008

(30) Foreign Application Priority Data

May 28, 2007   (JP) ................................. 2007-140990

(51) Int. Cl.
*F16C 32/06* (2006.01)
(52) U.S. Cl. ........................................ 384/107; 384/100
(58) Field of Classification Search .................. 384/100, 384/107, 112, 113, 115; 310/90; 360/99.08
See application file for complete search history.

(56) References Cited

U.S. PATENT DOCUMENTS

| | | | |
|---|---|---|---|
| 6,271,612 B1 * | 8/2001 | Tanaka et al. | 310/90 |
| 6,307,293 B1 * | 10/2001 | Ichiyama | 310/90.5 |
| 6,793,394 B2 | 9/2004 | Gomyo et al. | |
| 7,063,462 B2 * | 6/2006 | Aiello et al. | 384/107 |
| 7,101,084 B2 * | 9/2006 | Gomyo | 384/107 |
| 7,241,050 B2 | 7/2007 | Uenosono et al. | |
| 7,527,432 B2 * | 5/2009 | Asada et al. | 384/107 |
| 2001/0022869 A1 * | 9/2001 | Tanaka et al. | 384/100 |
| 2003/0011929 A1 * | 1/2003 | Nii et al. | 360/99.08 |
| 2006/0008190 A1 * | 1/2006 | Hamada et al. | 384/107 |
| 2006/0140521 A1 * | 6/2006 | Uenosono et al. | 384/100 |
| 2007/0103020 A1 * | 5/2007 | Obara et al. | 310/90 |
| 2007/0140605 A1 * | 6/2007 | Asada et al. | 384/107 |
| 2007/0230840 A1 * | 10/2007 | Asada et al. | 384/107 |
| 2007/0230841 A1 * | 10/2007 | Yano et al. | 384/110 |

FOREIGN PATENT DOCUMENTS

| | | |
|---|---|---|
| JP | 10-259820 | 9/1998 |
| JP | 2003-28147 | 1/2003 |
| JP | 2005-308057 | 11/2005 |

* cited by examiner

*Primary Examiner* — Thomas R Hannon
(74) *Attorney, Agent, or Firm* — Wenderoth, Lind & Ponack, L.L.P.

(57) ABSTRACT

A hydrodynamic bearing device includes a sleeve having a bearing hole, a shaft, and a flange cover. The shaft is disposed in the bearing hole of the sleeve in a state of being capable of relative rotation, and has a large diameter flange portion. The flange cover is disposed opposite the bottom surface of the flange portion. A bubble suppression portion, which is formed as a recess on the bottom surface of the shaft, communicates with the upper surface of the flange portion through a communicating hole in the flange portion. This provides a hydrodynamic bearing device with which negative pressure is prevented from being generated in the bearing even when it is subjected to impact or vibration, and durability and reliability can be enhanced, as well as a spindle motor and a recording and reproducing apparatus equipped with this hydrodynamic bearing device.

9 Claims, 12 Drawing Sheets

US 7,972,065 B2

HYDRODYNAMIC BEARING DEVICE, SPINDLE MOTOR, AND RECORDING AND REPRODUCING APPARATUS EQUIPPED WITH SAME

CROSS-REFERENCE TO RELATED APPLICATIONS

This application claims priority under 35 U.S.C. §119 to Japanese Patent Application No. 2007-140990 filed on May 28, 2007. The entire disclosure of Japanese Patent Application No. 2007-140990 is hereby incorporated herein by reference.

BACKGROUND OF THE INVENTION

I. Field of the Invention

The present invention relates to a hydrodynamic bearing device installed in a motor that rotationally drives a magnetic disk, optical disk, or other such recording disk, and more particularly relates to a hydrodynamic bearing device that is more compact and can be used in portable devices, and to a spindle motor and a recording and reproducing apparatus equipped with this hydrodynamic bearing device.

II. Background Information

A hydrodynamic bearing device in which the fluid pressure of oil or another such lubricating fluid interposed between a shaft and a sleeve is utilized to support the shaft and the sleeve so that they can rotate relative to one another has been proposed in the past as a bearing for spindle motors used in recording devices that rotationally drive a magnetic disk, optical disk, magneto optical disk or other such disk-shaped recording medium.

A series of tiny gaps are formed between the shaft and the sleeve, and a hydrodynamic groove formed in the circumferential direction of the rotational axis (radial hydrodynamic groove) and a hydrodynamic groove formed in the radial direction of the rotational axis (thrust hydrodynamic groove) are provided to the shaft or the sleeve or both. Oil is held as a lubricating fluid in these tiny gaps. One type of such hydrodynamic bearing devices has a structure in which a taper seal is formed at the end of the series of tiny gaps and exposed to the atmosphere, which is called a single-pocket structure.

With the single-pocket hydrodynamic bearing device disclosed in Japanese Laid-Open Patent Application 2005-308057, the shaft has a large-diameter flange portion at the bottom surface, and the flange portion is provided on a flange cover (cover plate). A thrust hydrodynamic groove is formed on the flange portion and/or the flange cover. The faces are flat everywhere except in the portion where the thrust hydrodynamic groove is formed.

With a conventional hydrodynamic bearing device structured like this, when the shaft begins to rotate, the oil is drawn into the radial and thrust bearing portions by the pumping pressure generated by the hydrodynamic grooves, and the fluid pressure rises within the hydrodynamic grooves. This results in a state in which the shaft and the sleeve are able to rotate relative to each other without touching.

In some cases, communicating holes are provided in the inner periphery of the flange portion, as seen in Japanese Laid-Open Patent Application 2003-28147, for example, in order to eliminate the pressure imbalance at the top and bottom of the thrust bearing portion during rotation.

With a conventional hydrodynamic bearing device, because the flange portion and the flange cover are made up of flat faces, and furthermore because the gap around the flange portion is relatively narrow (about 0.1 mm), vibration or impact due to a fall or the like tends to generate a portion of negative pressure at the center of the flange portion, so bubbles may be generated and as a result the lubricating fluid may leak out from the taper seal.

The mechanism of bubble generation will now be described. When the bearing device is stopped, the flange portion and the flange cover magnetically attract each other between the rotor magnet and the base, which is made of a magnetic material, and therefore come into contact with each other. If the bearing device should be dropped and subjected to an impact or vibration, so that the flange portion rises with the shaft, then the space between the sleeve and flange cover and the area around the flange portion increases by a volume corresponding to how far the main portion of the shaft has risen. When the shaft rises, the oil present on the upper surface of the flange portion in a stopped state attempts to move below the flange portion through the narrow gap between the bottom surface of the sleeve and the outer periphery of the flange portion. If the movement of the shaft is too sudden, however, the oil will be prevented by its own viscosity from sufficiently working its way below the flange portion. As a result, and coupled with the fact that the space between the sleeve and flange cover and the area around the flange portion increases by a volume corresponding to how far the main portion of the shaft has risen, a negative pressure portion is generated below the flange portion. Specifically, the center portion of the flange portion enters a vacuum state, and there is the risk that air or the like that has dissolved into the lubricating fluid after the work of filling the space with the lubricating fluid, for example, will create bubbles. Also, the surface of the oil exposed to the atmosphere at the taper seal rises according to how much oil did not work its way below the flange portion.

If a shaft that has risen should drop suddenly in a state in which bubbles have been generated, and before the bubbles have dissolved into the oil, the bubbles generated below the flange portion will be flattened out and rise, and depending on the volume of the generated bubbles, the surface of the oil that is exposed to the atmosphere at the taper seal will rise even more than in the initial stopped state. When this happens, there is the risk that the oil will leak out at the taper seal.

In particular, when communicating holes are provided passing through at the top and bottom of the sleeve for the purpose of pressure equalization, the oil is more apt to flow through the communicating holes than through the radial bearing portion, which means that bubbles are likely to enter the communicating holes. Bubbles that come through the communicating holes may cause the oil level to rise suddenly near the openings of the communicating holes, and the oil may leak out from the taper seal. If the oil leaks out, it can adversely affect the durability and performance of the hydrodynamic bearing device.

Even if communicating holes that communicate with the top and bottom of the flange portion are provided on the inner peripheral side of the flange portion as in Japanese Laid-Open Patent Application 2003-28147, if the distal end of the shaft is in the same plane as the bottom surface of the flange portion as shown in FIG. 19 of Japanese Laid-Open Patent Application 2003-28147, the bottom surface of the flange portion will tend to be under negative pressure in the event of an impact, the result being that bubbles are apt to be generated. Specifically, if the distal end of the shaft is in the same plane as the bottom surface of the flange portion, there is a smaller cross sectional area available for the oil to flow through the communicating holes from the upper surface of the flange portion to the bottom surface of the flange portion. As a result, if the shaft should move suddenly away from the flange cover, the flow resistance of the oil will increase, so the negative pressure on the bottom surface of the flange portion side will not be sufficiently eliminated, and bubbles will tend to be generated.

As shown in FIG. 5 of Japanese Laid-Open Patent Application 2003-28147, with a configuration in which the flange portion is fixed to the shaft with fixing screws, the screw head distal ends must be cross-shaped or star-shaped so that they can be turned with a screwdriver, and the shape is not in axial symmetry. Consequently, the oil is agitated by the screw heads during rotation, which makes it more likely that bubbles will be generated.

SUMMARY OF THE INVENTION

It is an object of the present invention to provide a hydrodynamic bearing device with which the generation of negative pressure inside the bearing can be prevented, and durability and reliability can be increased, even when the bearing devise is subjected to impact or vibration, and to provide a spindle motor and a recording and reproducing apparatus equipped with this hydrodynamic bearing device.

A hydrodynamic bearing device pertaining to the first invention comprises a sleeve, a shaft, a lubricating fluid, a bearing portion, a flange cover, a bubble suppression portion, and at least one first communicating portion that communicates with the bubble suppression portion. The sleeve has an insertion hole. The shaft is disposed in the insertion hole of the sleeve so as to be capable of rotation relative to the sleeve, and has a main portion and a large diameter portion having a larger diameter than the main portion. The lubricating fluid is held in a gap formed between the sleeve and the shaft. The bearing portion supports the sleeve and the shaft in the rotational direction and the axial direction, with the lubricating fluid interposed in between, so as to allow relative rotation between the sleeve and shaft. The flange cover is fixed to the sleeve on one end side in the axial direction of the shaft, and disposed opposite from one face of the large diameter portion. The bubble suppression portion is formed as a recess in the flange cover and/or one end of the shaft.

Here, the bubble suppression portion is formed as a recess in the shaft or the flange cover or both.

Furthermore, at least one first communicating portion is formed that communicates between the bubble suppression portion and the other face of the large diameter portion that is not opposite the flange cover.

When the bubble suppression portion is formed in the shaft, and the main portion and the large diameter portion of the shaft are formed integrally, the bubble suppression portion may be provided to just one end of the main portion, but may instead be formed in a size that reaches all the way to one face of the large diameter portion. When the large diameter portion and main portion of the shaft are separate, one end of the main portion may be recessed more than the large diameter portion to form the bubble suppression portion, or one end of the main portion may be formed in a smaller diameter, the large diameter portion fixed to this smaller diameter portion, and the end of the smaller diameter portion recessed more than the large diameter portion to form the bubble suppression portion. Furthermore, the bubble suppression portion may be extended to the periphery of the smaller diameter portion of one face of the large diameter portion.

Also, the large-diameter portion of the shaft may be the flange portion that constitutes the portion supporting the bearing portion in the axial direction, or may be the retainer portion that keeps the shaft from coming loose from the sleeve.

Here, since the bubble suppression portion is formed as a recess, and at least one first communicating portion is formed that communicates between the bubble suppression portion and the other face of the large diameter portion that is not opposite the flange cover, the volume of space is greater between the flange cover and sleeve and the periphery of the large diameter portion, and the volume of the lubricating fluid being held is also larger, which allows the lubricating fluid to move more smoothly between the top and bottom of the large diameter portion. Accordingly, even if the volume of the above-mentioned space increases by an amount corresponding to the amount of rise of the main portion as the shaft moves up or down suddenly, the proportional increase versus the space as a whole will be small, and the lubricating fluid will tend not to be affected by an increase in volume. At the same time, smoother movement of the lubricating fluid makes it less likely that a region of negative pressure will be created in the lubricating fluid.

Therefore, even if the hydrodynamic bearing device is subjected to impact or vibration, causing the shaft and the sleeve to move suddenly up or down relative to each other, negative pressure will be less likely to be generated in the lubricating fluid in the center of the bottom surface of the shaft. As a result, it is possible to prevent problems such as leakage of the lubricating fluid that would otherwise be caused by the generation of bubbles in the lubricating fluid that fills the inside of the bearing, and to improve the durability and reliability of the hydrodynamic bearing device.

Furthermore, as long as the first communicating portion communicates between the bottom surface of the shaft and the upper surface of the large diameter portion, it may be in the form of a hole or a groove. For instance, when the main portion and the large diameter portion are separate bodies, a groove may be formed in the large diameter portion or the main portion to constitute the first communicating portion.

The hydrodynamic bearing device pertaining to the second invention is the hydrodynamic bearing device pertaining to the first invention, wherein an equivalent diameter De2 in a radial cross section of the bubble suppression portion at a location that intersects the first communicating portion is greater than an equivalent diameter De1 in a cross section perpendicular to the direction in which the first communicating portion extends. Here, the equivalent diameter De1 is four times the quotient of dividing the cross sectional area A1 in a cross section perpendicular to the direction in which the first communicating portion extends by the peripheral length L1, and is expressed by the following relational formula (1).

$$De1=4A1/L1 \quad (1)$$

Also, the equivalent diameter De2 is four times the quotient of dividing the radial cross sectional area A2 of the bubble suppression portion at a radial location that intersects the first communicating portion by the peripheral length L2, and is expressed by the following relational formula (2).

$$De2=4A2/L2 \quad (2)$$

The effect of thus setting the equivalent diameter De2 of the bubble suppression portion larger than the equivalent diameter De1 of the first communicating portion is that the lubricating fluid that has flowed in the first communicating portion provided to the large diameter portion will be less likely to be hindered in its flow at the intersection with the bubble suppression portion.

Therefore, even if the hydrodynamic bearing device is subjected to a stronger impact or vibration, causing the shaft and the sleeve to move suddenly up or down relative to each other, negative pressure will be even less likely to be generated in the lubricating fluid in the center of the bottom surface of the shaft. As a result, it is possible to prevent problems such as leakage of the lubricating fluid that would otherwise be caused by the generation of bubbles in the lubricating fluid that fills the inside of the bearing, and to improve the durability and reliability of the hydrodynamic bearing device.

The hydrodynamic bearing device pertaining to the third invention is the hydrodynamic bearing device pertaining to the first or second invention, wherein the bubble suppression portion is symmetrical around the rotational axis. This suppresses agitation of the lubricating fluid in the bubble suppression portion during rotation, and eliminates the generation of a negative pressure portion or the generation of bubbles in the lubricating fluid. Therefore, even if the hydrodynamic bearing device is subjected to a stronger impact or vibration, causing the shaft and the sleeve to move suddenly up or down relative to each other, negative pressure will be even less likely to be generated in the lubricating fluid in the center of the bottom surface of the shaft. As a result, it is possible to prevent problems such as leakage of the lubricating fluid that would otherwise be caused by the generation of bubbles in the lubricating fluid that fills the inside of the bearing, and to improve the durability and reliability of the hydrodynamic bearing device.

The hydrodynamic bearing device pertaining to the fourth invention is the hydrodynamic bearing device pertaining to any of the first to third inventions, wherein the first communicating portion opens near the outer peripheral surface of the main portion. Accordingly, the first communicating portion opens into the gap of the bearing portion that supports in the rotational direction, and above the other face of the large diameter portion.

The result is that even if the gap between the sleeve and the upper surface of the large diameter portion is blocked off when the sleeve and the large diameter portion of the shaft come into contact, the lubricating fluid can still flow through the first communicating portion to one end of the shaft. This means that it is even less likely that negative pressure will be generated in the bearing.

The hydrodynamic bearing device pertaining to the fifth invention is the hydrodynamic bearing device pertaining to any of the first to fourth inventions, wherein the bubble suppression portion is formed at one end of the shaft.

Here, the bubble suppression portion is formed at the end of the shaft where negative pressure is likely to be generated and where the hydrodynamic groove which supports in the axial direction is usually formed.

The result is that the bubble suppression portion can be easily provided to the bottom surface of the shaft by lathe turning or the like. Also, when a thrust hydrodynamic groove is formed by coining in a shaft having an integrated large diameter portion and main portion, the bubble suppression portion can be formed at the same time. Furthermore, if the bubble suppression portion is formed recessed on the flange cover side, when strength is taken into account, the thickness of the flange cover must be increased according to the recessed depth of the bubble suppression portion, which makes it difficult to achieve a product that is compact. However, if the bubble suppression portion is provided at one end of the shaft, strength problems will be less likely to occur, so the flange cover can be thinner, and the axial length of the radial bearing portion can be increased correspondingly. As a result, the bearing stiffness of the radial bearing portion can be raised, and this reduces motor runout.

The hydrodynamic bearing device pertaining to the sixth invention is the hydrodynamic bearing device pertaining to any of the first to fifth inventions, wherein the large diameter portion is formed integrally with the main portion.

Here, the main portion and large diameter portion of the shaft are formed integrally, the result being that the shaft can be produced more easily, by forging, sintering, die casting, or another such forming technique. As a result, the shape and dimensional precision of the first communicating portion can be enhanced, and productivity and yield can be improved. Also, even if the bearing should be subjected to a large impact, there will be less large diameter portion deformation in relation to the main portion.

The hydrodynamic bearing device pertaining to the seventh invention is the hydrodynamic bearing device pertaining to any of the first to fifth inventions, wherein the large diameter portion is separate from the main portion and is fixed to the main portion.

Here, the shaft is made up of two members, namely, the main portion and the large diameter portion that is fixed to the main portion.

The effect of this is that merely by disposing one end of the main portion recessed with respect to the large-diameter portion, the bubble suppression portion formed recessed at one end of the shaft can be formed simply, without performing any pressing or other such machining.

The hydrodynamic bearing device pertaining to the eighth invention is the hydrodynamic bearing device pertaining to any of the first to seventh inventions, wherein the sleeve has at least one second communicating portion that communicates with both end faces thereof.

Here, a second communicating portion that communicates with both end faces is provided to the sleeve in order to aid the circulation of lubricating fluid and adjust the pressure.

Bubbles tend not to be produced by negative pressure at the bottom surface of the shaft, so even though the second communicating portion is provided, it is possible to prevent the overflow of the lubricating fluid that is apt to occur near the second communicating portion. Also, by providing the second communicating portion, when the bearing is subjected to an impact, high pressure can be prevented from being exerted directly on the radial bearing portion adjacent to the flange portion, and the pressure is softened by the second communicating portion. As a result, the leakage of the lubricating fluid at the taper seal located at the upper end of the radial bearing portion can be suppressed more effectively.

A spindle motor pertaining to the ninth invention comprises a stationary member, a rotary member, and the hydrodynamic bearing device pertaining to any of the first to eighth inventions. The stationary member has a base and a stator that is fixed to the base. The rotary member has a rotor magnet that is disposed across from the stator and constitutes a magnetic circuit along with the stator, and a hub that fixes the rotor magnet. The hydrodynamic bearing device is fixed to the base and supports the rotary member rotatably with respect to the stationary member.

With this spindle motor, durability and reliability can be improved even when the motor is used under conditions of being subjected to a large impact.

A recording and reproducing apparatus pertaining to the tenth invention comprises the spindle motor pertaining to the ninth invention and information access means. The information access means writes or reads information to or from the required location on a recording medium on which information can be recorded.

With this recording and reproducing apparatus, durability and reliability can be improved even when the apparatus is used under conditions of being subjected to a large impact.

With the hydrodynamic bearing device pertaining to the present invention, even if the hydrodynamic bearing device should be subjected to impact or vibration, so that the shaft and the sleeve violently move up or down relative to one another, negative pressure will tend not to be generated in the center portion of the shaft. As a result, it is possible to prevent problems such as leakage of the lubricating fluid that would otherwise be caused by the generation of bubbles in the lubricating fluid that fills the inside of the bearing, and to improve the durability and reliability of the hydrodynamic bearing device.

DETAILED DESCRIPTION OF THE PREFERRED EMBODIMENTS

First Embodiment

A spindle motor 1 equipped with a hydrodynamic bearing device 30 pertaining to a first embodiment of the present invention will be described through reference to FIGS. 1 to 5.

Figure 1:
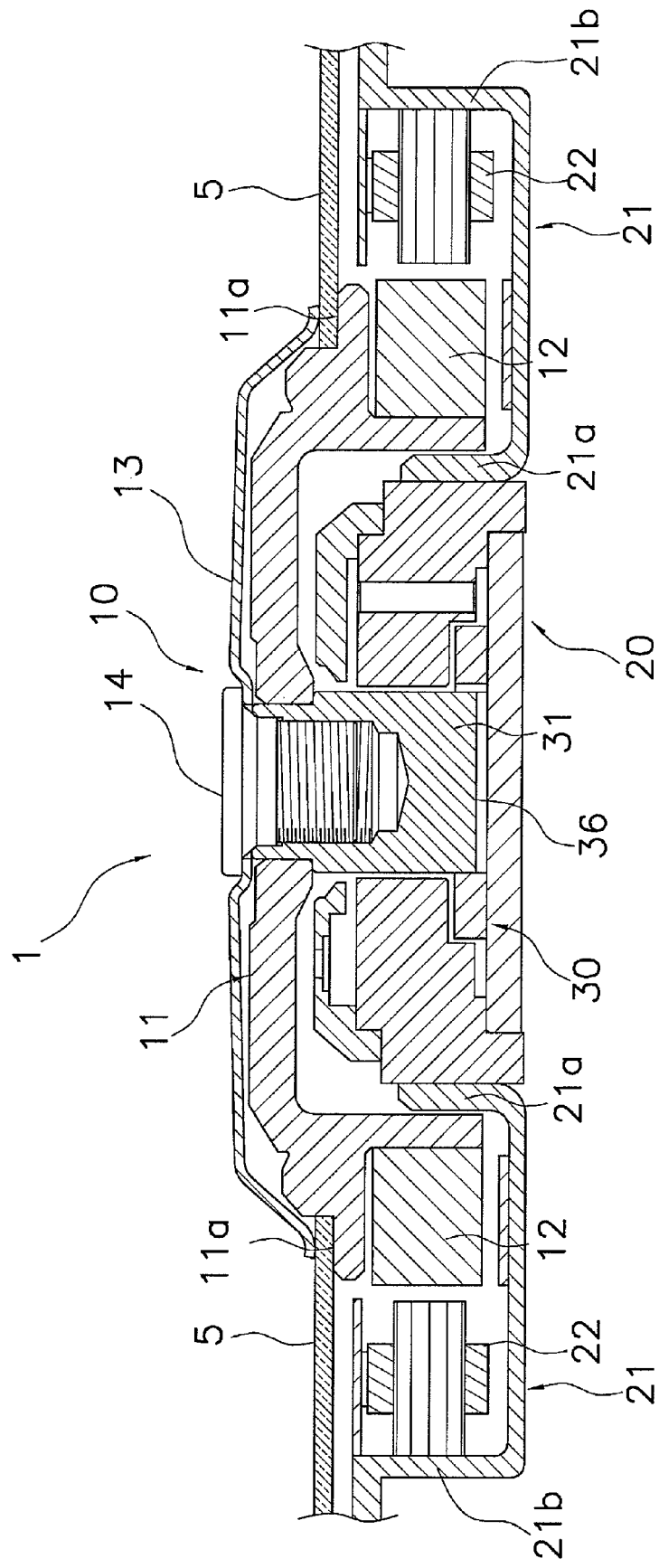
FIG. 1 is a cross section of a spindle motor including a hydrodynamic bearing device pertaining to a first embodiment of the present invention.

In the following description, the up and down directions in FIG. 1 are referred to as the axial direction, with the upward direction being referred to as the "upward axial direction" (outward axial direction) and the downward direction as the "downward axial direction" (inward axial direction), etc., but these are not intended to limit the actual attachment directions of the hydrodynamic bearing device 30.

<Overall Configuration of Spindle Motor 1>

As shown in FIG. 1, the spindle motor 1 pertaining to the first embodiment is a device for rotationally driving a recording disk (recording medium) 5, and mainly comprises a rotating member 10, a stationary member 20, and the hydrodynamic bearing device 30 pertaining to the first embodiment.

The rotating member 10 mainly has a hub 11 on which the recording disk 5 is mounted, and a rotor magnet 12.

The hub 11 is formed from stainless steel, which is an iron-based metal material (such as martensite- or ferrite-based stainless steel, an example being DHS1 made by Daido Steel), and is integrated with a shaft 31 by press-fitting, adhesive bonding, welding, or the like to the shaft 31. Also, the hub 11 has an integrally formed disk mounting portion 11a for mounting the recording disk 5 on the outer peripheral part.

The rotor magnet 12 is fixed to the outer peripheral surface of the hub 11, and constitutes a magnetic circuit along with a stator 22 (discussed below). The rotor magnet 12 is composed of a magnetic material with a high energy product, such as a neodymium-iron-boron-based resin magnet, and its surface has undergone rust-proofing and anti-chipping treatments, as well as coating with an epoxy resin, nickel plating, or the like.

The recording disk 5 is mounted on the disk mounting portion 11a, and is pressed in the downward axial direction by a damper 13 fixed by a fixing bolt 14 to the shaft 31 (discussed below), for example, and thereby clamped between the damper 13 and the disk mounting portion 11a.

As shown in FIG. 1, the stationary member 20 is constituted mainly by a base 21 and a stator 22 that is fixed to the base 21.

The base 21 also serves as a housing for a recording and reproducing apparatus, and has a first base portion 21a that serves as the foundation of the hydrodynamic bearing device 30 (discussed below), and a second base portion 21b for attaching the stator 22. The base 21 is formed from an aluminum-based metal material or an iron-based metal material.

The stator 22 is fixed to the second base portion 21b, and is disposed at a location opposite the rotor magnet 12. The stator core of the stator 22 is formed by stacking silicon steel sheets with a thickness of from 0.15 to 0.20 mm.

<Detailed Configuration, etc., of Hydrodynamic bearing device 30>

Figure 2:
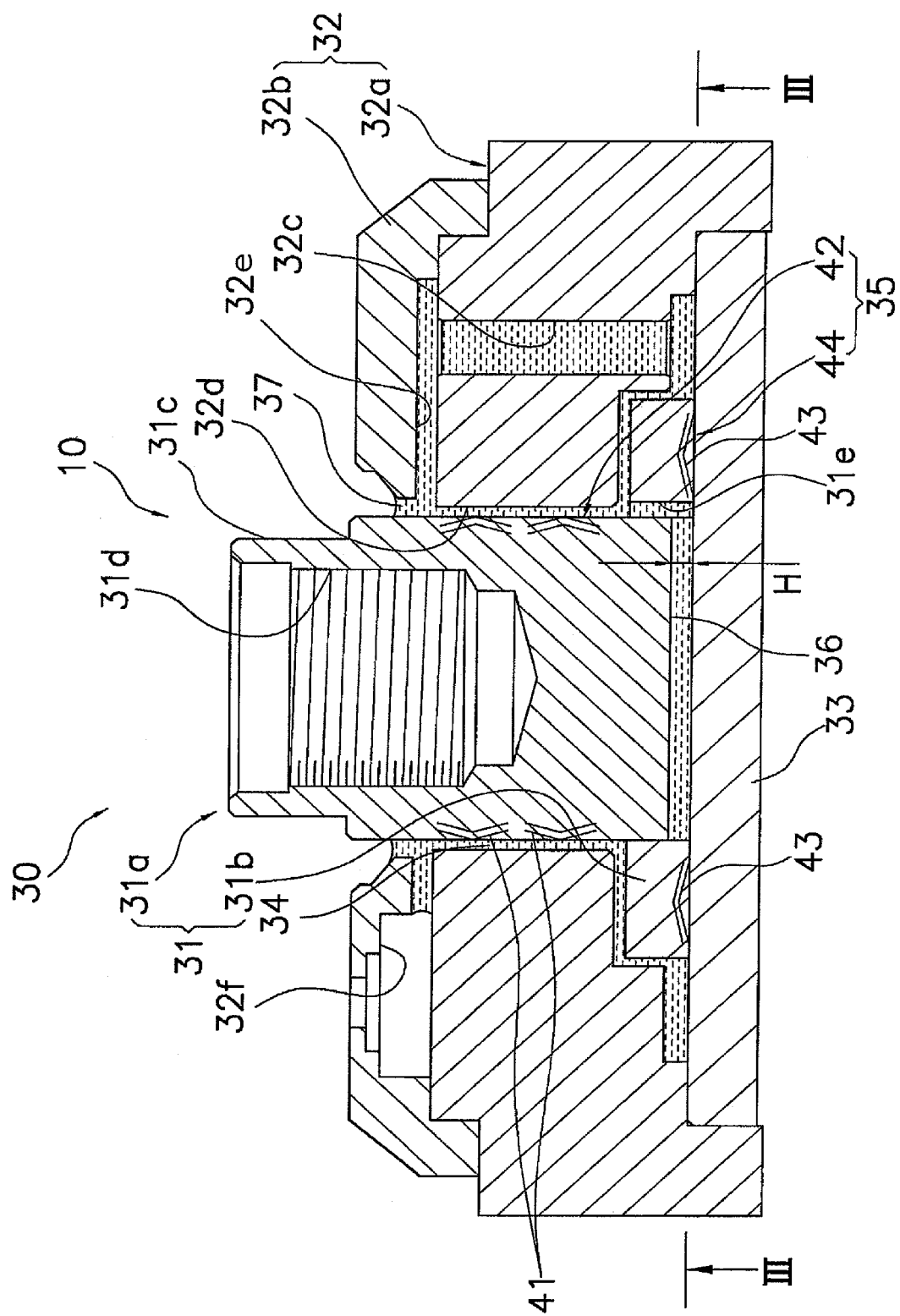
FIG. 2 is a detail cross section of the hydrodynamic bearing device included in FIG. 1.

As shown in FIG. 1, the hydrodynamic bearing device 30 is fixed in an opening formed in the approximate center portion of the base 21, and supports the rotating member 10 in a rotatable state with respect to the stationary member 20. As shown in FIG. 2, the hydrodynamic bearing device 30 is constituted mainly by a sleeve 32, the shaft 31, which is disposed in the sleeve 32, a flange cover 33, and oil 34 that serves as a lubricating fluid. The hydrodynamic bearing device 30 further comprises a bearing portion 35 that supports the shaft 31 and the sleeve 32 so as to be capable of rotating relative to one another, a bubble suppression portion 36 that suppresses the generation of bubbles at one end (the bottom surface) of the shaft 31, and a taper seal 37. Of these portions, in this embodiment the sleeve 32 and the flange cover 33 constitute members on the stationary side, while the shaft 31 constitutes a member on the rotating side.

Figure 3:
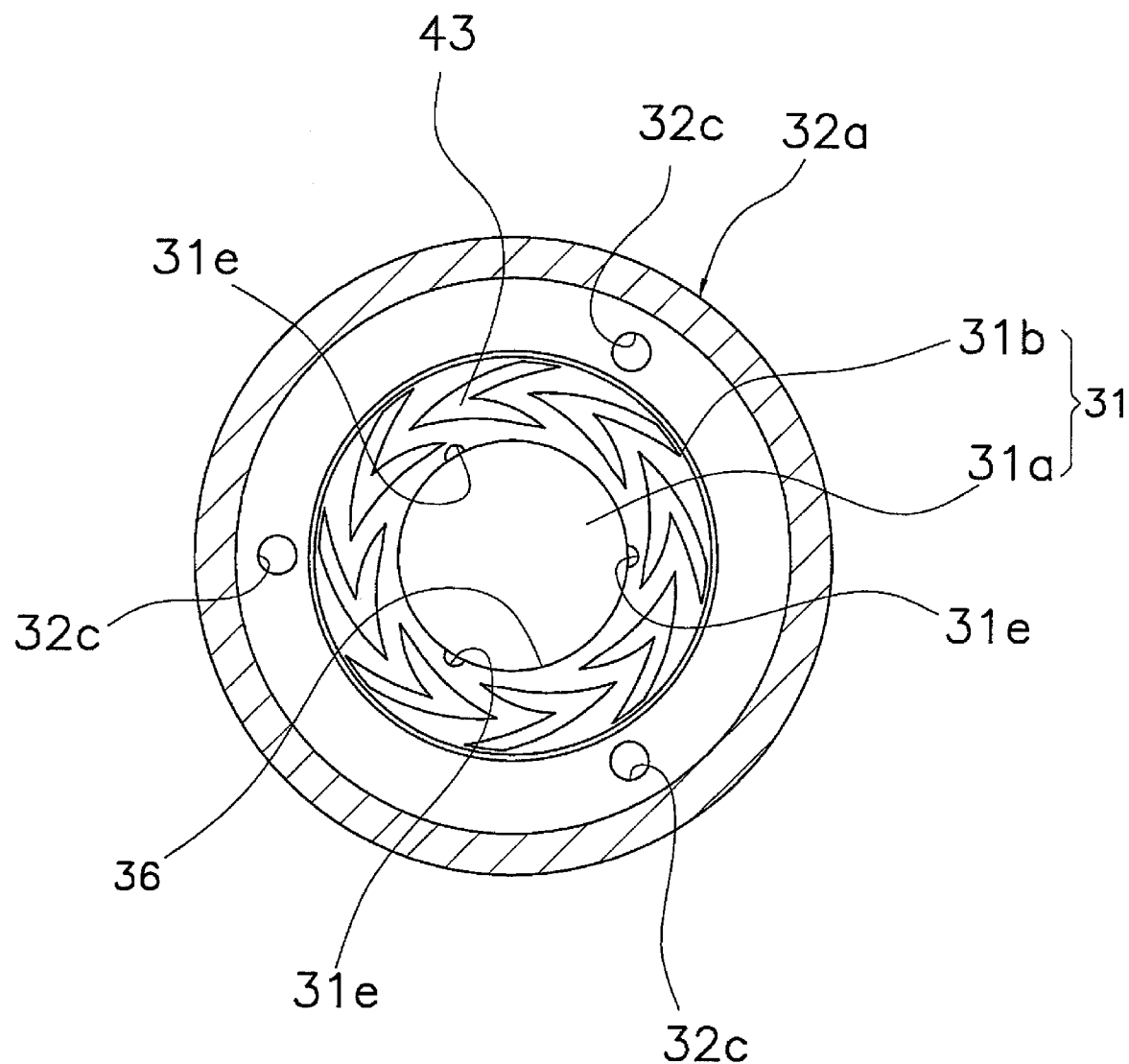
FIG. 3 is a cross section of the bottom face of the shaft along the III-III line in FIG. 2.

The sleeve 32 is a substantially cylindrical member formed, for example, from pure iron, stainless steel, a copper alloy, a sintered metal, or the like, has a bearing hole 32d (an example of an insertion hole) extending in the axial direction, and is fixed to the base 21. The sleeve 32 is constituted by a sleeve main portion 32a disposed at a location opposite the outer peripheral side of the shaft 31, and a sleeve cap 32b disposed at a location opposite the upper part of the shaft 31. At least one communicating hole 32c (an example of a second communicating portion) that communicates with the upper and bottom surfaces is formed in the sleeve main portion 32a. As shown in FIG. 3, in this embodiment three communicating holes 32c are disposed spaced apart in the circumferential direction. The bearing hole 32d is a stepped cylindrical hole constituted by two (one large and one small) cylinders. The sleeve cap 32b is a member with a roughly inverted dish shape, and forms an oil reservoir 32e and a bubble release 32f. The communicating holes 32c are holes for communicating between the upper and bottom surfaces of the sleeve main portion 32a, and are provided to allow the oil 34 to circulate and equalize the pressure.

The shaft 31 is a flanged cylindrical member, extending in the axial direction, and formed from stainless steel, which is an iron-based metal material (such as SUS 303, which is austenite-based stainless steel, or ASK8000 (made by Akiyama Steel), which has a higher manganese content than ordinary austenite-based stainless steel, or SUS 420, which is a martensite-based stainless steel), or a ceramic or the like. The shaft 31 is inserted in the bearing hole 32d of the sleeve 32. More specifically, the shaft 31 is disposed in a state of being capable of relative rotation with respect to the sleeve 32 and the flange cover 33 via a gap. The shaft 31 has a cylindrical main portion 31a and a flange portion 31b (an example of a large diameter portion) fixed to one end (the bottom surface) of the main portion 31a. A hub mounting portion 31c formed in a smaller diameter is formed at the other end (the upper end) of the main portion 31a. A threaded hole 31d into which the fixing bolt 14 is threaded is formed in the upper surface. As shown in FIG. 1, the hub 11 is fixed by press-fitting, adhesive bonding, laser welding, or another suitable fixing means to the outer peripheral surface of the hub mounting portion 31c, and rotates along with the shaft 31. As shown in FIG. 2, the bottom surface of the main portion 31a is disposed above the bottom surface of the shaft 31 as a whole, that is, above the bottom surface of the flange portion 31b, and the bottom surface of the shaft 31 is recessed. The recessed portion serves as the bubble suppression portion 36.

The flange portion 31b is fixed press-fitting, adhesive bonding, laser welding, or another suitable fixing means to the outer peripheral surface of the bottom surface of the main portion 31a. At least one communicating hole 31e (an example of the first communicating portion) is formed at a location on the flange portion 31b near the outer peripheral surface of the main portion 31a. As shown in FIG. 3, in this embodiment three communicating holes 31e are formed spaced apart in the circumferential direction. The communicating holes 31e are formed so as to communicate between the upper and bottom surfaces of the flange portion 31b, and are formed in a substantially semicircular shape that allows direct communication with the bubble suppression portion 36.

Figure 20:
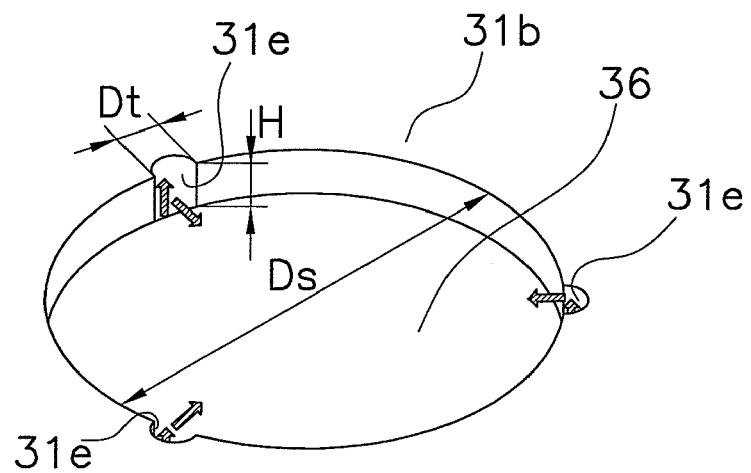
FIG. 20 is a diagram for finding the equivalent diameters of the bubble suppression portion and the communicating holes in the first embodiment shown in FIG. 2.

As shown in FIGS. 2 and 20, the bubble suppression portion 36 is formed such that the bottom surface of the shaft 31 is recessed by the dimension H from the bottom surface of the flange portion 31b. The dimension H here is defined as follows.

First, the equivalent diameter De1 is found as follows in a cross section perpendicular to the direction in which the communicating holes 31e extend (with the constitution shown in FIG. 2, a plane perpendicular to the axial direction). That is, the equivalent diameter De1 is four times the quotient of dividing the cross sectional area A1 in a cross section perpendicular to the direction in which the communicating holes 31e extend by the peripheral length L1, and is expressed by the following relational formula (1).

$$De1 = 4A1/L1 \tag{1}$$

The equivalent diameter De2 is defined as follows in a radial cross section of the bubble suppression portion 36 at a location that intersects the communicating holes 31e. That is, the equivalent diameter De2 is four times the quotient of dividing the radial cross sectional area A2 of the bubble suppression portion 36 at a radial location that intersects the communicating holes 31e by the peripheral length L2, and is expressed by the following relational formula (2).

$$De2 = 4A2/L2 \tag{2}$$

Here, the equivalent diameter De2 of the radial channel of the portion where the bubble suppression portion 36 intersects the communicating holes 31e is set to be greater than the equivalent diameter De1 of the communicating holes 31e. More specifically, with the configuration shown in FIG. 2, the communicating holes 31e are substantially semicircular in shape, so if we let Dt be the diameter of the communicating holes 31e as shown in FIG. 20, the peripheral length $L1 \approx \pi \cdot Dt/2 + Dt$, and the surface area $A1 \approx \pi \cdot Dt^2/8$. Therefore, the equivalent diameter De1 is approximated by 0.611 Dt.

Also, the communicating holes 31e and the bubble suppression portion 36 intersect on a pitch circle with the same diameter as the diameter Ds of the main portion 31a. The channel cross section in which this intersecting portion (the portion in which the oil 34 flows from the upper surface to the bottom surface of the flange portion 31b) is viewed from the radial inner periphery, in the case of the configuration in FIG. 20, is considered to be a rectangle in which the peripheral width is Dt and the height is H, and equivalent diameter De2 may be calculated on the bubble suppression portion 36 side. Because this rectangle has a width Dt and a height H, $L2 = 2(Dt+H)$, and $A2 = Dt \cdot H$, so $De2 = 2Dt \cdot H/(Dt+H)$. Here, the height H may be set such that $De2 > De1$.

As shown in FIG. 2, the flange cover 33 is a disk-shaped member formed from stainless steel, which is an iron-based metal material (such as SUS 420), or ultra-molecular carbide alloy (such as FB10). The flange cover 33 is disposed within the sleeve main portion 32a so as to block of a substantially circular opening formed at the lower end in the axial direction of the bearing hole 32d of the sleeve main portion 32a.

The various portions comprised by the stationary member 20 and the rotating member 10 will now be described.

A radial hydrodynamic groove (an example of a hydrodynamic groove) 41 with a herringbone pattern that is known in this field of technology is provided to the outer peripheral surface of the main portion 31a, and a thrust hydrodynamic groove 43 is provided to the bottom surface of the flange portion 31*b* (the face opposite the flange cover 33). Therefore, a radial bearing portion 42 that includes the radial hydrodynamic groove 41 and that supports the shaft 31 and the sleeve 32 in the rotational direction so as to be capable of relative rotation is formed between the sleeve 32 and the main portion 31*a* of the shaft 31. Also, a thrust bearing portion 44 that includes the thrust hydrodynamic groove 43 and that supports the shaft 31 and the sleeve 32 in the axial direction so as to be capable of relative rotation is formed between the flange cover 33 and the flange portion 31*b* of the shaft 31. The bearing portion 35 is constituted by the radial bearing portion 42 and the thrust bearing portion 44.

Since the thrust hydrodynamic groove 43 is formed in a herringbone pattern in the thrust bearing portion 44 here, it is less likely that there will be a pressure differential between the upper and bottom surfaces at the inner peripheral part of the flange portion 31*b*, and the floating balance is more stable than with a spiral pattern.

The taper seal 37 is a gap formed by the outer peripheral surface below the hub mounting portion 31*c* of the main portion 31*a* of the shaft 31 and the inner peripheral surface of the sleeve cap 32*b*. The gap of the taper seal 37 widens toward the outside in the axial direction, and the outer end in the axial direction is exposed to the atmosphere. In this embodiment, the inner peripheral surface of the sleeve cap 32*b* has a tapered structure, and constitutes a shape in which the gap widens toward the outside in the axial direction. This allows the oil 34 to be supported by capillary action.

The oil 34 fills the communicating holes 32*c* and 31*e* and the gap formed between the flange cover 33 and the sleeve 32 and shaft 31, including the radial bearing portion 42 and the thrust bearing portion 44. A low-viscosity ester oil or the like can be used as the oil 34, for example.

As discussed above, this hydrodynamic bearing device 30 is a flanged shaft type that is constituted by the bearing portion 35 that includes the radial bearing portion 42 and the thrust bearing portion 44.

<Operation of Spindle Motor 1>

The operation of the spindle motor 1 will now be described through reference to FIGS. 1 and 2.

With the spindle motor 1, a rotating magnetic field is generated when power is sent to the stator 22, and rotational force is imparted to the rotor magnet 12. As a result, the rotating member 10 can be rotated along with the shaft 31 around the shaft 31.

When the shaft 31 rotates, it generates support pressure in the radial and axial directions in the hydrodynamic grooves 41 and 43. The shaft 31 is thus supported in a state of non-contact with respect to the sleeve 32. Specifically, the rotating member 10 is able to rotate in a state of non-contact with respect to the stationary member 20, and this allows the recording disk 5 to rotate at high speed and accuracy.

<Action During Up and Down Motion of Shaft 31>

Figure 4:
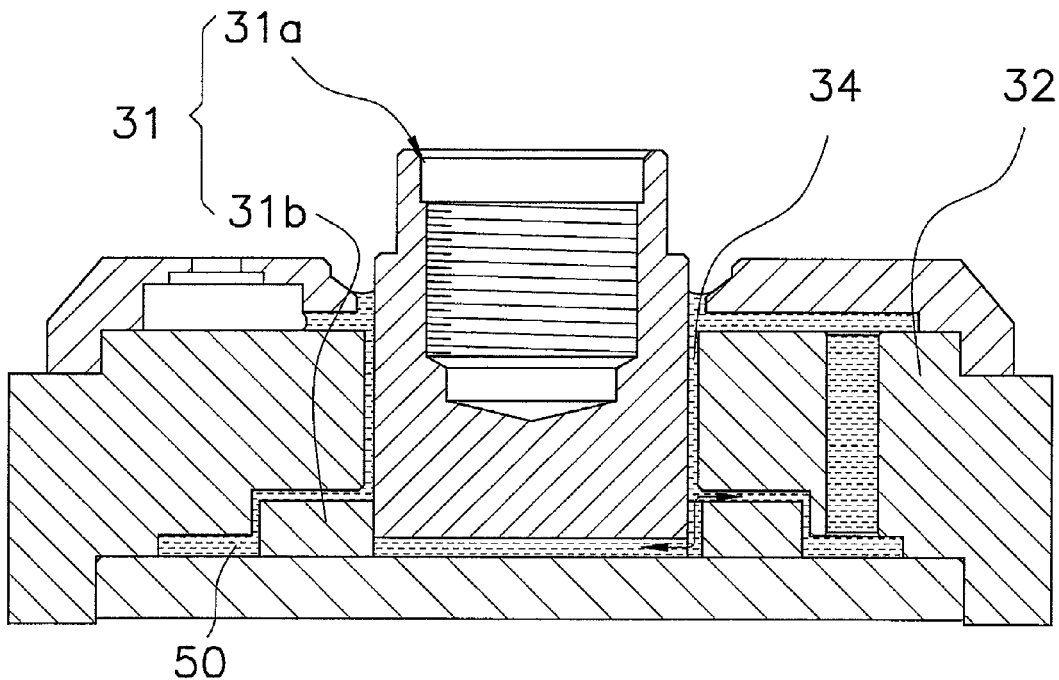
FIG. 4 is a detail cross section of the hydrodynamic bearing device when the shaft has been disposed at its lower end position.

When the shaft 31 is disposed at its lower end position as shown in FIG. 4 when rotation has been stopped, the communicating holes 31*e* allow the oil 34 to flow between the bubble suppression portion 36 and the radial bearing portion 42 and the upper surface of the flange portion 31*b*, as indicated by the arrow in FIG. 4.

Figure 5:
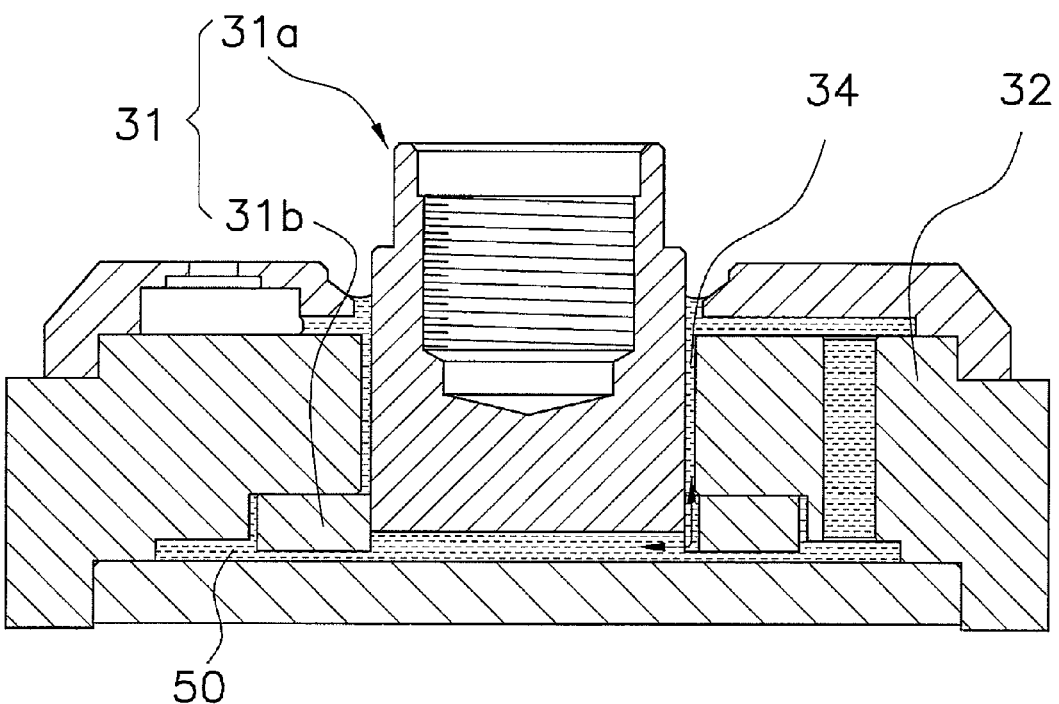
FIG. 5 is a detail cross section of the hydrodynamic bearing device when the shaft has been disposed at its upper end position.

When the shaft 31 rises from its lower end position shown in FIG. 4 to its upper end position as shown in FIG. 5, the space 50 between the sleeve 32 and flange cover 33 and the periphery of the flange portion 31*b* expands by a volume corresponding to how far the main portion 31*a* of the shaft 31 has risen. At this point, any oil 34 present on the upper surface of the flange portion 31*b* tries to go through the outer periphery of the flange portion 31*b* to the bottom surface of the flange portion 31*b*. However, if the shaft 31 should rise suddenly due to impact caused by a fall or the like, the viscosity of the oil 34 makes it difficult for it to move from the upper surface of the flange portion 31*b*, through the outer periphery, and to the bottom surface, so the oil 34 tends not to flow into the space 50. As a result, negative pressure is created at the bottom surface of the shaft 31, and bubbles attempt to form. With this embodiment, however, since the bubble suppression portion 36 is formed recessed in the bottom surface of the shaft 31, the volume of the space 50 is increased in proportion to the bubble suppression portion 36 compared with a case where the bubble suppression portion 36 were not formed. Therefore, even though the oil 34 does not flow into the space 50, the proportional increase in the volume of the space caused by shaft movement is smaller than it would be if the bubble suppression portion 36 were not formed. As a result, a high negative pressure tends not to be created in the space 50, and bubbles are less likely to be generated. Furthermore, since the bubble suppression portion 36 communicates with the upper surface of the flange portion 31*b* through the communicating holes 31*e*, the oil 34 flows through the communicating holes 31*e* and into the space 50 during a rise, as indicated by the arrow in FIG. 5, and this makes it even less likely that negative pressure will be generated.

Also, since the equivalent diameter De2 in a radial cross section of the bubble suppression portion 36 at a location that intersects the communicating holes 31*e* is set to be greater than the equivalent diameter De1 in a cross section perpendicular to the axial direction of the communicating holes 31*e*, the flow of the oil 34 that has passed through the communicating holes 31*e* is not impeded by the bubble suppression portion 36, and the generation of negative pressure can be suppressed more effectively.

<Features of Hydrodynamic bearing device 30>

(1)

With the hydrodynamic bearing device 30 in this embodiment, as shown in FIGS. 2 and 3, the bubble suppression portion 36, which suppresses the generation of bubbles by preventing the generation of negative pressure, is formed recessed at the bottom surface of the shaft 31.

Here, since the bubble suppression portion 36 is formed recessed at the bottom surface of the shaft 31, the volume of the space 50 is greater between the sleeve 32 and flange cover 33 and the periphery of the flange portion 31*b*, and the volume of the oil 34 held in this space is also greater. Therefore, even if up and down movement of the shaft 31 should increase the volume of the space 50 according to how far the main portion 31*a* has risen, the percentage increases to the space 50 whole will be small, and the oil 34 will tend not to be affected by the increase in volume.

Accordingly, when the hydrodynamic bearing device 30 is subjected to impact or vibration, causing the shaft 31 and sleeve 32 to move suddenly up or down relative to each other, even if the gap between the sleeve 32 and the upper surface of the flange portion 31*b* should be blocked off when the sleeve 32 comes into contact with the flange portion 31*b* of the shaft 31, negative pressure will be less likely to be generated in the oil 34 in the center portion of the bottom surface of the shaft 31. As a result, it is possible to prevent problems such as leakage of the oil 34 that would otherwise be caused by the generation of bubbles in the oil 34 that fills the inside of the bearing, and to improve the durability and reliability of the hydrodynamic bearing device.

(2)

With the hydrodynamic bearing device 30 in this embodiment, the communicating holes 31*e* are provided to allow the bottom surface of the shaft 31 to communicate with the upper face of the flange portion 31b that does not oppose to the flange cover 33.

Here, the bottom surface of the shaft communicates with the upper surface of the large diameter portion through the communicating holes 31e. Here, the communicating holes 31e facilitate the flow of the oil 34 between the bottom surface of the shaft 31 where the bubble suppression portion 36 is provided, and the upper surface of the flange portion 31b. Therefore, even if the shaft 31 should rise suddenly, the oil 34 that fills the gap (radial bearing portion 42) between the main portion 31a and the sleeve 32 will flow readily to the bottom surface of the shaft 31. Accordingly, even if the gap between the sleeve 32 and the upper surface of the flange portion 31b should be blocked off when the sleeve 32 comes into contact with the flange portion of the shaft 31, negative pressure will be even less likely to be generated in the center of the bottom surface of the shaft 31.

(3)

With the hydrodynamic bearing device 30 in this embodiment, the communicating holes 31e open near the outer peripheral surface of the main portion 31a. Accordingly, the communicating holes 31e open into the gap of the radial bearing portion 42 that supports the shaft 31 in the rotational direction above the upper surface of the flange portion 31b.

The result is that even if the gap between the sleeve 32 and the upper surface of the flange portion 31b should be blocked off when the sleeve 32 comes into contact with the flange portion 31b of the shaft 31, the oil 34 can still flow through the communicating holes 31e toward the bottom surface of the shaft 31. Accordingly, negative pressure is even less likely to be generated inside the hydrodynamic bearing device 30.

(4)

With the hydrodynamic bearing device 30 in this embodiment, the communicating holes 31e allow the bubble suppression portion 36 to communicate with the upper surface of the flange portion 31b that is not opposite the flange cover 33.

Here, the communicating holes 31e allow the upper surface of the flange portion 31b to communicate with the bubble suppression portion 36 formed in the bottom surface of the shaft 31.

The result is that the oil 34 is able to flow directly to the bubble suppression portion 36, where negative pressure is less likely to occur, and the generation of negative pressure can be prevented more effectively.

Modification of First Embodiment

A first embodiment of the present invention was described above, but the present invention is not limited to the first embodiment given above, and various modifications are possible without departing from the gist of the invention.

(A)

With the hydrodynamic bearing device 30 in the first embodiment above, the main portion 31a was fixed to the flange portion 31b without changing the diameter of the main portion 31a of the shaft 31, but the present invention is not limited to this.

Figure 6:
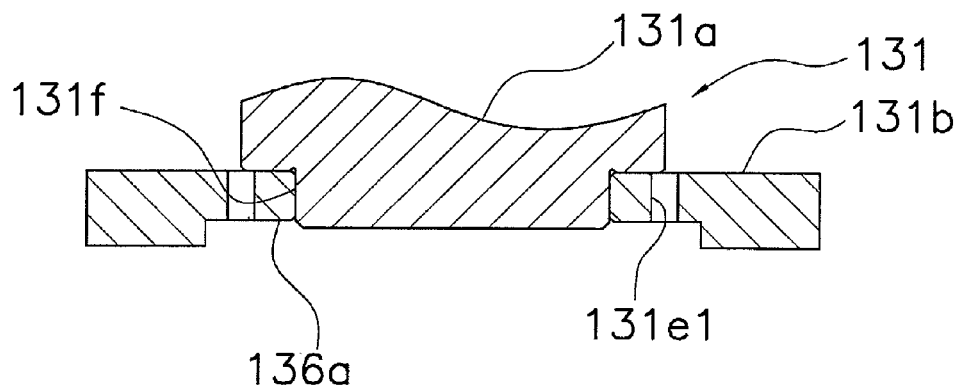
FIG. 6 is a detail cross section of the portion near the flange portion in a modification of the first embodiment.
Figure 7:
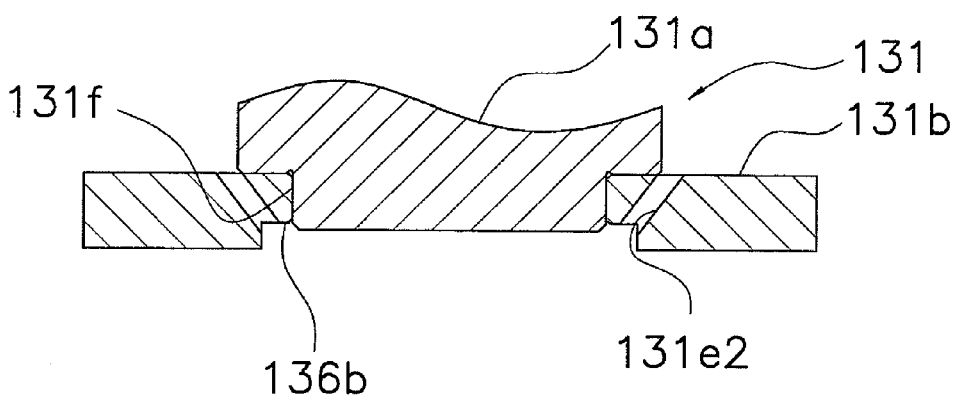
FIG. 7 is a detail cross section of the portion near the flange portion in another modification of the first embodiment.
Figure 8:
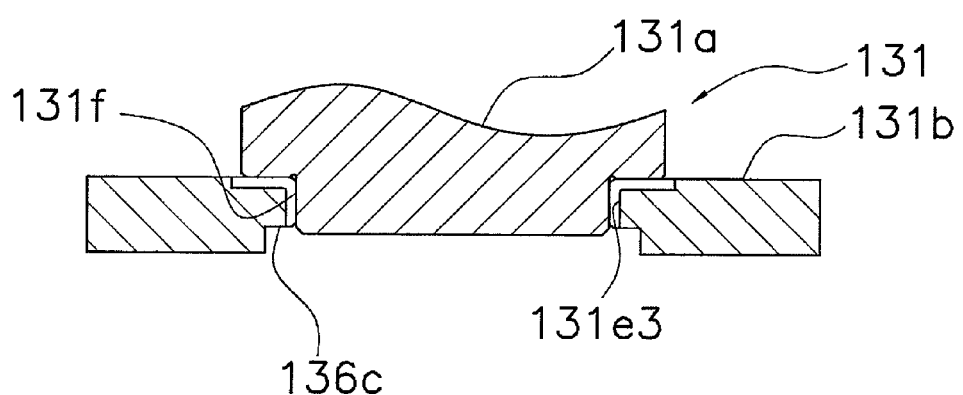
FIG. 8 is a detail cross section of the portion near the flange portion in yet another modification of the first embodiment.

For example, as shown in FIGS. 6 to 8, a small diameter fixed portion 131f may be formed at the lower part of a shaft 131, and a flange portion 131b may be fixed to the fixed portion 131f. When the small diameter fixed portion 131f is thus formed, in the fixing of the flange portion 131b to a main portion 131a, the flange portion 131b can be fixed accurately with respect to the main portion 131a with the stepped portion of the fixed portion 131f.

In FIG. 6, communicating holes 131e1 are constituted by circular through-holes. However, the upper ends of the communicating holes 131e1 are half-way blocked by the main portion 131a of the shaft 131, and therefore open onto the upper surface of the flange portion 131b in a semicircular arc shape. Also, the lower ends of the communicating holes 131e1 open to a bubble suppression portion 136a. The bubble suppression portion 136a is formed as a recess extending not just to the bottom surface of the main portion 131a that is disposed recessed, but also to the bottom surface of the flange portion 131b.

In FIG. 7, circular communicating holes 131e2 are formed aslant and communicate with a bubble suppression portion 136b. In this case, the size of the bubble suppression portion 136b can be smaller, and the thrust hydrodynamic groove can be correspondingly larger.

In FIG. 8, the first communicating portion is not a hole, but rather comprise L-shaped communicating grooves 131e3 formed on the inner peripheral side of the upper surface and the inner peripheral surface of the flange portion 131b, which affords communication between the upper surface of the flange portion 131b and a bubble suppression portion 136c. Forming the first communicating portion as grooves rather than holes allows the first communicating portion (the communicating grooves 131e3) to be formed easily by coining or other such press working. Here again, the size of the bubble suppression portion 136c can be smaller, and the thrust hydrodynamic groove can be correspondingly larger.

(B)

In the first embodiment and modification (A), the main portions 31a and 131a and the flange portions 31b and 131b were constituted separately in the shafts 31 and 131, but the present invention is not limited to this.

Figure 9:
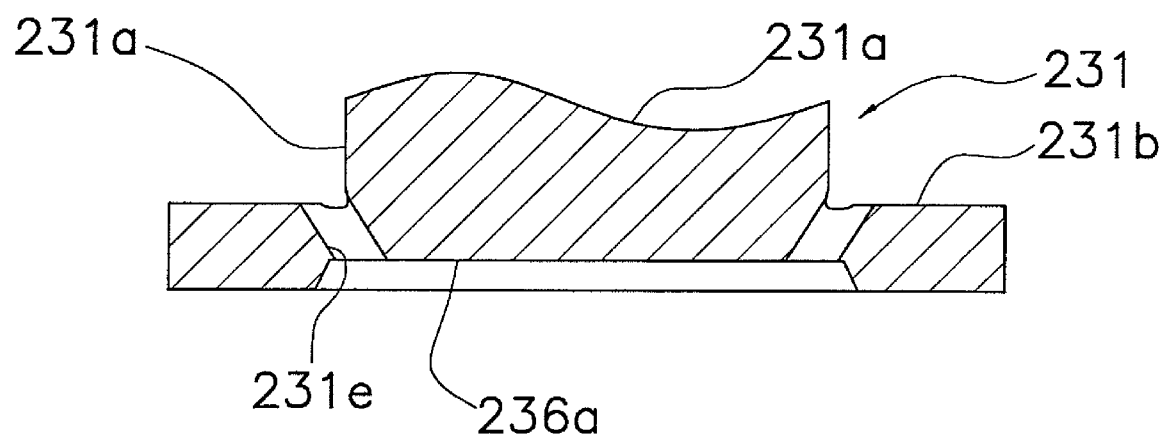
FIG. 9 is a detail cross section of the portion near the flange portion in yet another modification of the first embodiment.

In FIG. 9, a shaft 231 has a main portion 231a and a flange portion 231b that protrudes in the radial direction from the outer peripheral surface at the bottom surface of the main portion 231a, and the main portion 231a and the flange portion 231b are formed integrally. Communicating holes 231e serving as the first communicating portion are formed aslant toward a bubble suppression portion 236a. Here, since the main portion 231a and the flange portion 231b of the shaft 231 are formed integrally, the shaft 231 and the bubble suppression portion can be easily produced by utilizing sintering or die casting or other such molding technology. When the shaft is manufactured by molding technology, the communicating holes may be formed along the axial direction, rather than aslant, in order to facilitate removal from the mold. In this case the first communicating portion can also be easily formed by molding.

(C)

In the first embodiment, the communicating holes 31e (serving as the first communicating portion) communicated with the bubble suppression portion 36, but the communicating holes 31e need not communicate with the bubble suppression portion 36, as long as it allows communication between the upper and bottom surfaces of the flange portion 31b. Also, the communicating holes 31e were disposed near the outer peripheral surface of the main portion 31a, but may instead be disposed to the outside in the radial direction of the flange portion 31b. Again with this configuration, when the shaft 31 rises, the oil 34 goes through the communicating holes and works its way into the space 50 more readily than when there are no communicating holes.

In the first embodiment and its modification, as shown in FIGS. 2, 6, 7, 8, and 9, the bubble suppression portions 36, 136a to 136c, and 236a were in axial symmetry. This keeps the oil from being agitated in the bubble suppression portions 36, 136a to 136c, and 236a, and more effectively suppresses the generation of bubbles.

Further, when the flange portions 31b, 131b, and 231b are fixed by laser welding or the like to the main portions 31a, 131a, and 231a of the shafts 31, 131, and 231, there will be a certain amount of surface roughness at the weld, but as long as the maximum height of the surface roughness is sufficiently less than the thickness of the bubble suppression portions 36, 136a to 136c, and 236a (such as 50 microns or less), it is believed that will be no problem with considering the surface to be smooth from a fluid dynamics perspective, and the surface roughness caused by laser welding will not affect axial symmetry.

Figure 21:
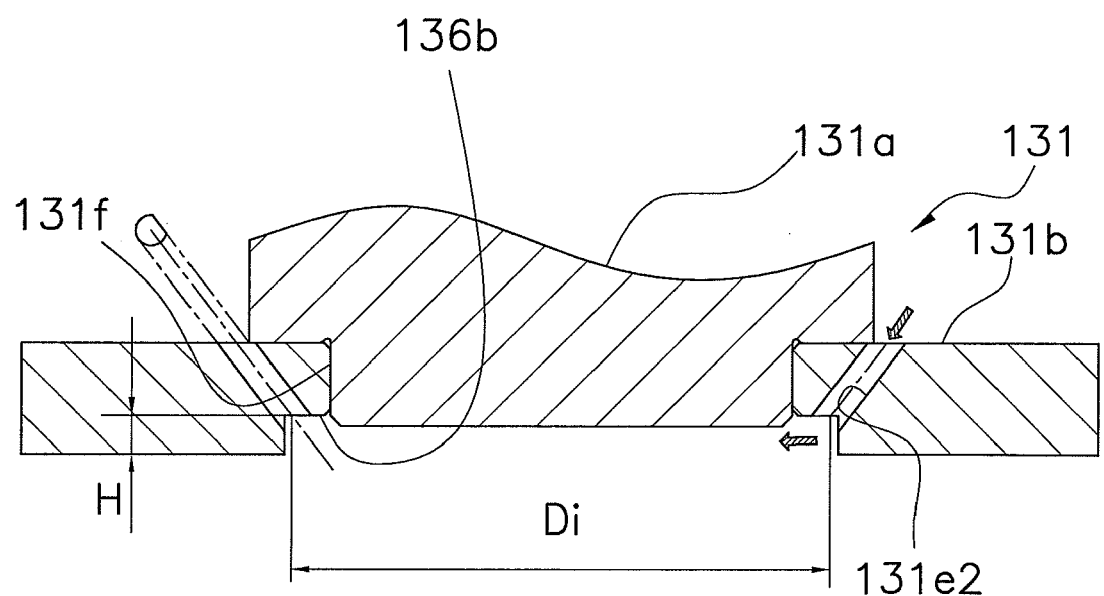
FIG. 21 is a diagram for finding the equivalent diameters of the bubble suppression portion and the communicating holes in the modification of the first embodiment shown in FIG. 7.

Also, as shown in FIGS. 7 and 21, the equivalent diameter De1 can be found even when the circular communicating holes 131e2 open aslant, are partially covered by the main portion 131a of the shaft 131, and are therefore D-shaped. As shown in FIG. 21, a radial cross section of the bubble suppression portion 136b at a location that intersects the communicating holes 131e2 is different from that in FIG. 20, and the equivalent diameter De2 of the bubble suppression portion 136b may be calculated by considering [the shape] to be a rectangle whose peripheral direction width is $\pi \cdot Di/N$ and whose height is H. With the mode in FIG. 20, the communicating holes 31e are open only on the inner peripheral side in the peripheral direction, whereas with the mode in FIG. 21, the oil 34 can flow to both sides in the peripheral direction, and this is believed to increase the peripheral direction width. However, N is the number of communicating holes 131e2 provided to the flange portion 131b, and the diameter Di is the pitch circle diameter at the intersection between the bubble suppression portion 136b and the center axis of the communicating holes 131e2. The movement of oil will be smoother and the generation of bubbles will be suppressed if the equivalent diameter De2 of the channel on the side of the bubble suppression portion 136b thus obtained is made larger than the equivalent diameter De1 of the communicating holes 131e2, that is, if these are set such that De2>De1. In other modes as well, bubble generation can be suppressed more reliably by designing the first communicating portion and the bubble suppression portion under the same design concept.

Second Embodiment

Figure 10:
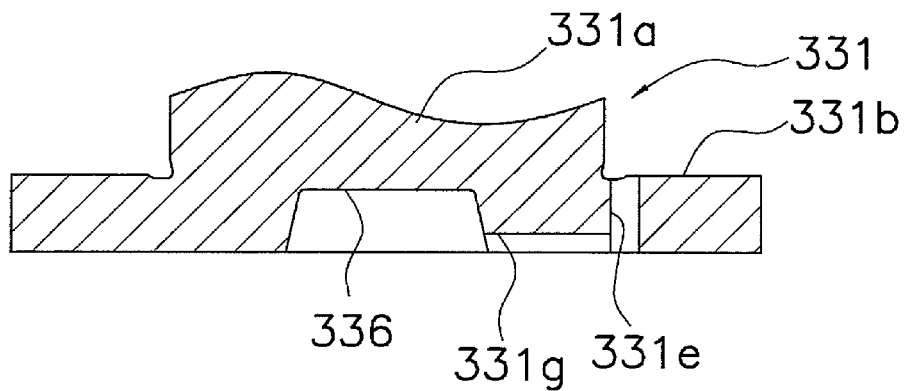
FIG. 10 is a detail cross section of the portion near the flange portion in the hydrodynamic bearing device pertaining to a second embodiment of the present invention.
Figure 11:
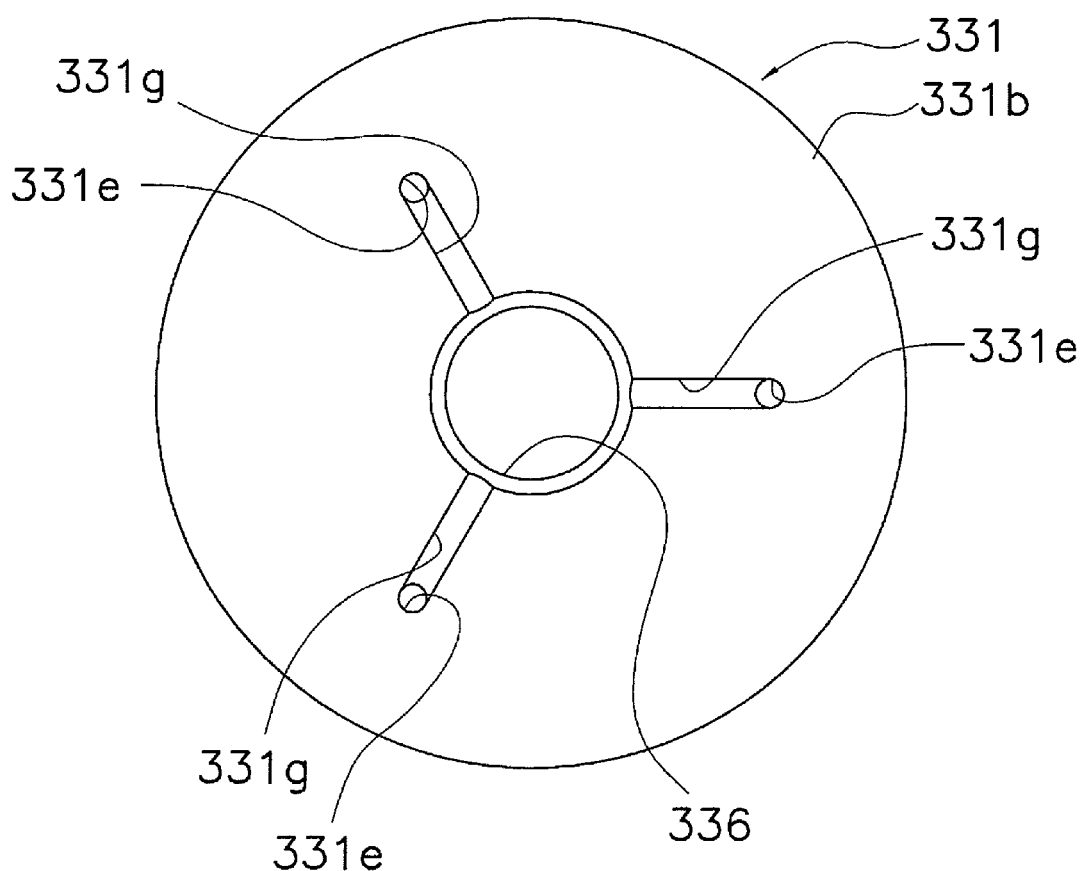
FIG. 11 is a bottom view of the shaft in the hydrodynamic bearing device pertaining to the second embodiment of the present invention.

In the first embodiment the first communicating portion communicated directly with the bubble suppression portion, but as shown in FIGS. 10 and 11, communicating holes 331e and a bubble suppression portion 336 may be made to communicate by communicating grooves 331g formed in a shaft 331. In FIG. 10, a main portion 331a and a flange portion 331b of the shaft 331 are formed integrally. The communicating holes 331e serving as the first communicating portion are formed in the axial direction as round holes that go through the upper and bottom surfaces of the flange portion 331b near the outer peripheral surface of the main portion 331a. The bubble suppression portion 336 is linked with the communicating holes 331e by the communicating grooves 331g. As shown in FIG. 11, three communicating holes 331e and three communicating grooves 331g, for example, are formed spaced apart in the circumferential direction. Therefore, the communicating grooves 331g are disposed radiating out from the bubble suppression portion 336.

The bubble suppression portion 336 is formed such that its diameter is smaller than the diameter of the main portion 331a on the bottom surface of the shaft 331, and such that its cross section is trapezoidal.

With the shaft 331 configured as above, the bubble suppression portion 336 is formed with a trapezoidal cross section, the communicating holes 331e are formed in the axial direction, and the communicating grooves 331g are formed in a radial pattern on the bottom surface of the flange portion 331b, so when the shaft 331 is molded, these portions can be molded at the same time. This reduces the cost of manufacturing the shaft 331.

A second embodiment of the present invention was described above, but the present invention is not limited to the second embodiment given above, and various modifications are possible without departing from the gist of the invention.

Modification of Second Embodiment (A)

In the second embodiment, the main portion 331a and flange portion 331b of the shaft 331 were formed integrally, but may instead be separate as in the first embodiment.

Figure 12:
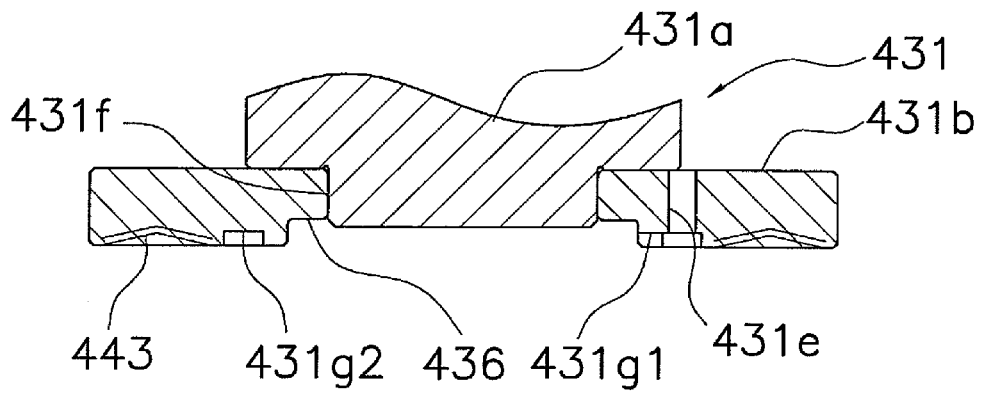
FIG. 12 is a detail cross section of the portion near the flange portion in a modification of the second embodiment.

In FIG. 12, a small diameter fixed portion 431f is formed at the lower part of a shaft 431, and a flange portion 431b is fixed with the fixed portion 431f. When the small diameter fixed portion 431f is thus formed, in the fixing of the flange portion 431b to a main portion 431a, the flange portion 431b can be fixed accurately with respect to the main portion 431a with the stepped portion of the fixed portion 431f.

Figure 13:
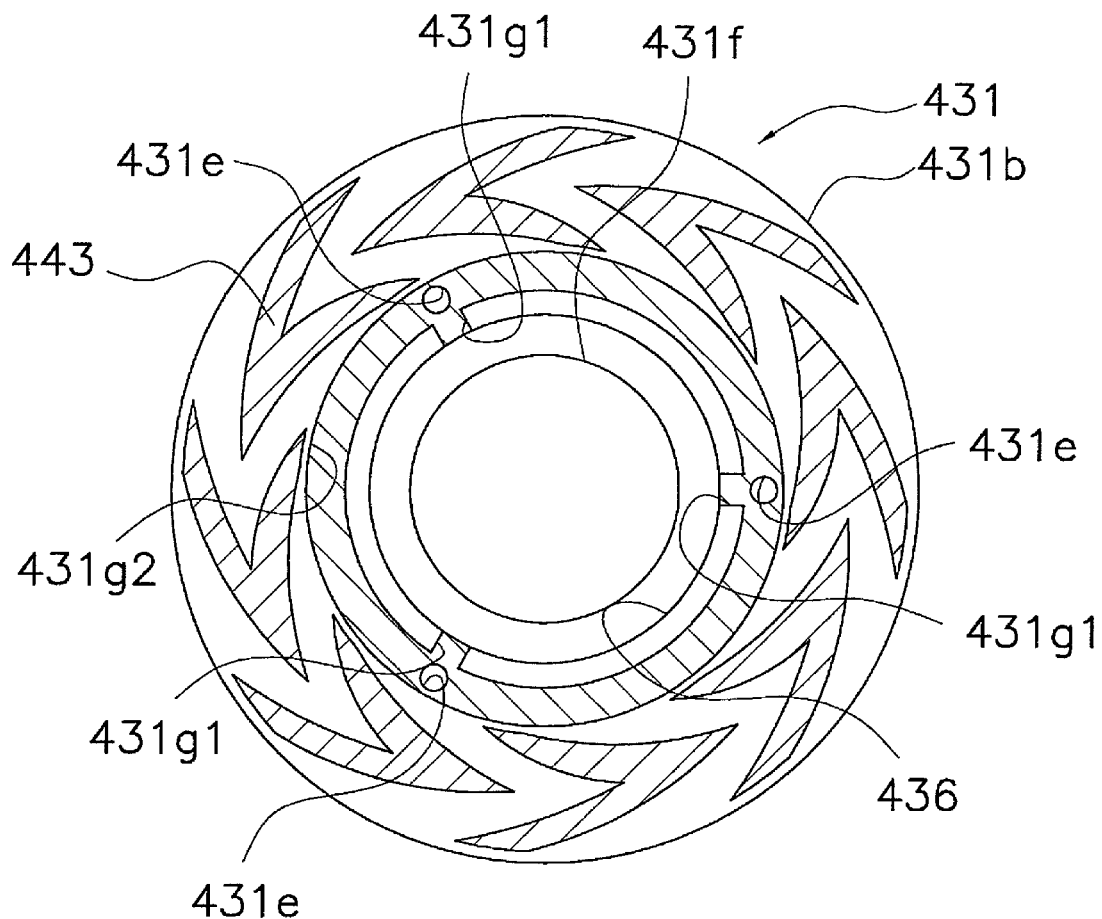
FIG. 13 is a bottom view of the shaft in a modification of the second embodiment.

As shown in FIGS. 12 and 13, communicating holes 431e are constituted by circular through-holes. The hatched region in FIG. 13 is grooves (recesses). However, just as in the modification of the first embodiment shown in FIG. 6, the upper ends of the communicating holes 431e are half-way blocked by the main portion 431a of the shaft 431, and therefore open onto the upper surface of the flange portion 431b in a semicircular arc shape. Also, the lower ends of the communicating holes 431e1 do not open directly to a bubble suppression portion 436. The bubble suppression portion 436 is formed as a recess extending not just to the bottom surface of the main portion 431a that is disposed recessed, but also to the bottom surface of the flange portion 431b. As shown in FIG. 13, three communicating holes 431e are provided, for example, spaced apart in the circumferential direction.

First communicating grooves 431g1 are formed in a radial pattern at the lower end of the communicating holes 431e. This allows the communicating holes 431e to communicate with the bubble suppression portion 436. A ring-shaped intermediate communicating groove 431g2 is also formed in addition to the first communicating grooves 431g1. The intermediate communicating groove 431g2 is formed concentrically with the center of the shaft 431 so as to communicate with the three communicating holes 431e.

Also, thrust hydrodynamic grooves 443 are formed on the outer peripheral side of the intermediate communicating groove 431g2. The thrust hydrodynamic grooves 443 have a herringbone pattern just as in the first embodiment. Thus forming the ring-shaped intermediate communicating groove 431g2 allows the oil introduced from the communicating holes 431e to diffuse quickly into the space, making it more unlikely that negative pressure will be produced.

(B)

Figure 14:
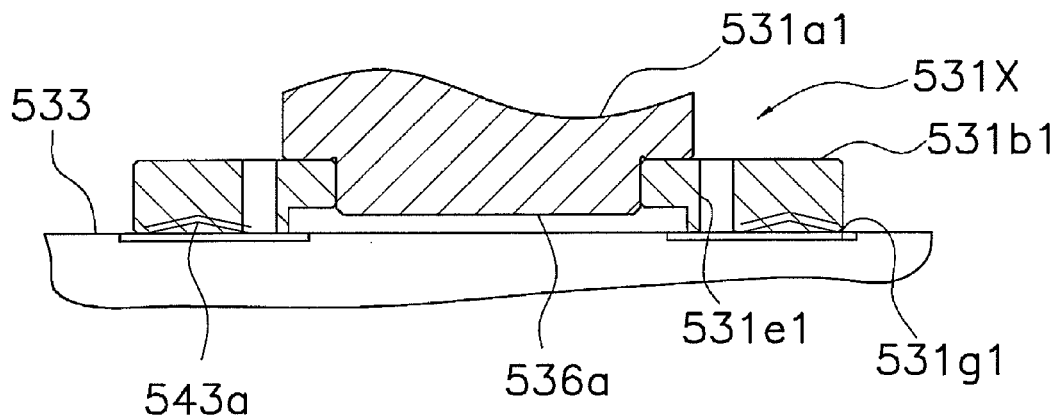
FIG. 14 is a detail cross section of the portion near the flange portion in another modification of the second embodiment.
Figure 15:
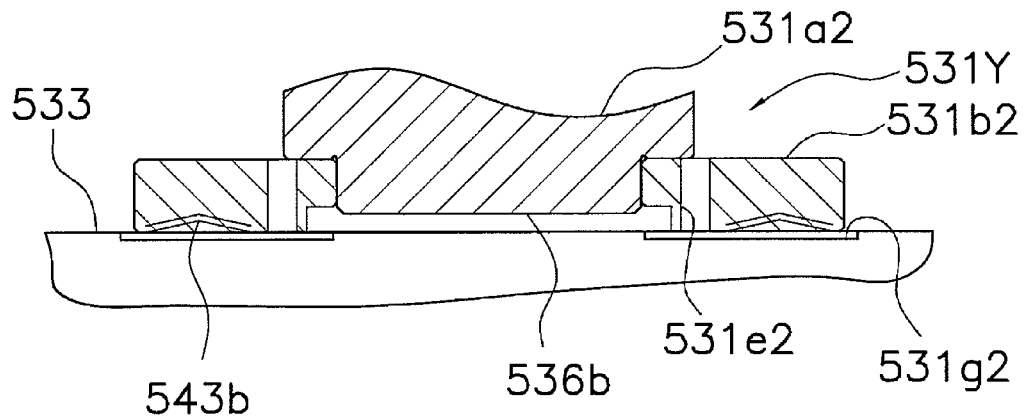
FIG. 15 is a detail cross section of the portion near the flange portion in yet another modification of the second embodiment.
Figure 16:
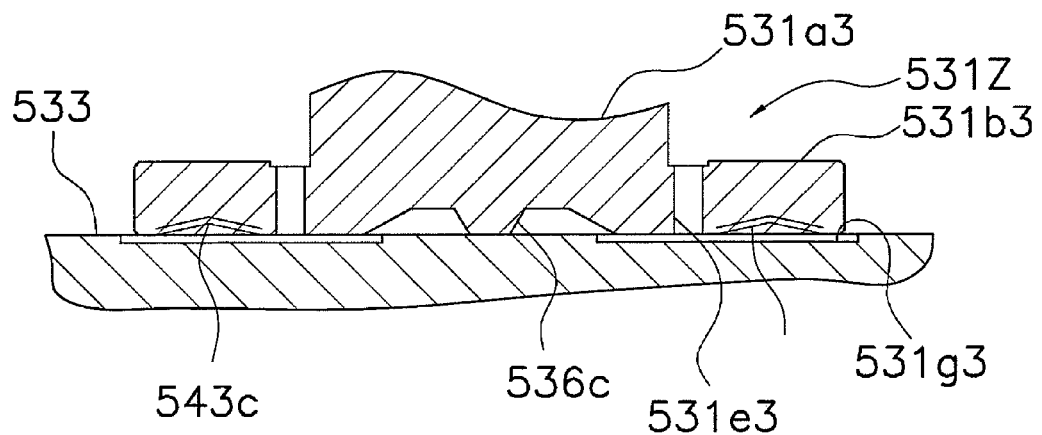
FIG. 16 is a detail cross section of the portion near the flange portion in yet another modification of the second embodiment.

In modification (A) above, the first communicating grooves 431g1 were formed in the flange portion 431b of the shaft 431, but as shown in FIGS. 14 to 16, communicating grooves 531g1 to 531g3 that link bubble suppression portions 536a to 536c with communicating holes 531e1 to 531e3, respectively, may be formed in a flange cover 533. With the modification shown in FIGS. 14 and 15, flange portions 531b1 and 531b2 of shafts 531X and 531Y are separate from main portions 531*a*1 and 531*a*2, but in the modification in FIG. 16, a main portion 531*a*3 and flange portion 531*b*3 of a shaft 531Z are integrated. Also, in FIGS. 14 and 16, the communicating holes 531*e*1 and 531*e*3 open in a circular shape at both of the flange portions 531*b*1 and 531*b*3, but in FIG. 15, just as in the modification of the first embodiment shown in FIG. 6, the opening is semicircular at the upper surface of the flange portion 531*b*2.

The communicating grooves 531*g*1 to 531*g*3 are formed in a radial pattern on the upper surface of the flange cover 533, going from the bubble suppression portions 536*a* to 536*c* and past the outer peripheral parts of the flange portions 531*b*1 to 531*b*3, and extending radially (in the radial direction) to thrust hydrodynamic grooves 543*a* to 543*c*.

The communicating grooves 531*g*1 to 531*g*3 may also be formed in a ring shape, rather than a radial pattern. Also, not all of the thrust hydrodynamic grooves 543*a* to 543*c* may communicate.

In this modification the oil flows even more efficiently, so the generation of negative pressure can be suppressed even better.

Other Embodiments (A)

In the first and second embodiments above, a flange portion acting as a thrust bearing portion was given as an example of a large diameter portion, but the large diameter portion only needs to be larger in diameter than the main portion, and may be a shaft retainer.

Figure 17:
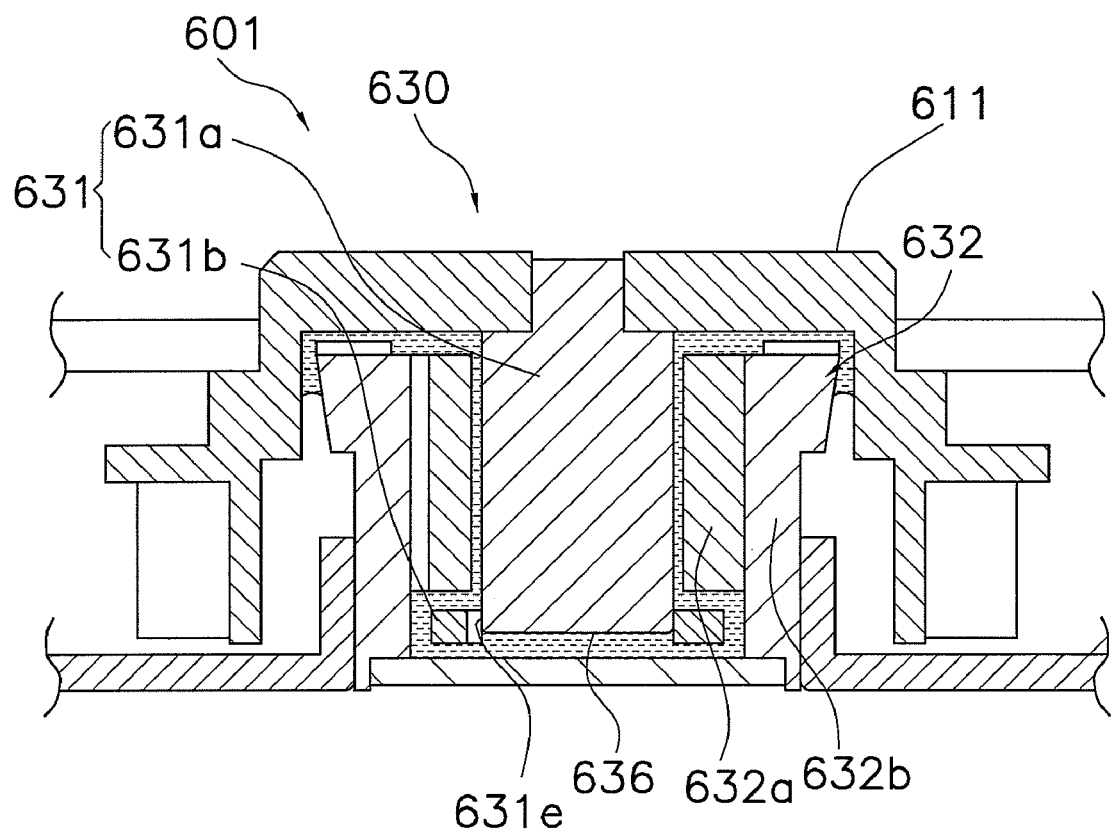
FIG. 17 is a cross section of the hydrodynamic bearing device pertaining to yet another embodiment of the present invention.

In FIG. 17, a shaft 631 of a hydrodynamic bearing device 630 of a spindle motor 601 has at its lower end a large diameter retainer (an example of the large diameter portion) 631*b* for holding the shaft 631 in place. This retainer 631*b* is formed separately from the main portion 631*a*, but may also be integral. A bubble suppression portion 636 is formed recessed in the bottom surface of the shaft 631 and in substantially the same diameter as the main portion 631*a*. Communicating holes (an example of the first communicating portion) 631*e* are holes that pass through the upper and bottom surfaces of the retainer 631*b*, and open near the outer peripheral surface of the main portion 631*a*. Three communicating holes 631*e*, for example, are disposed spaced apart in the circumferential direction. In this embodiment, thrust hydrodynamic grooves are disposed between a hub 611 and a sleeve 632. Also, the sleeve 632 consists of two parts: an inner sleeve 632*a* made of a sintered material, and an outer sleeve 632*b*.

Thus, the retainer 631*b*, which does not function as a thrust bearing portion, may be the large diameter portion.

(B)

In the first and second embodiments above, the number of communicating holes 131*e* to 431*e* was either two or three, but the number of communicating holes is not limited to these, and may be one or more. In terms of achieving balanced rotation, the number of communicating holes is preferably about two to six.

Also, when a second communicating portion is provided to the sleeve, the number and shape of the communicating portions are preferably determined so that the pressure loss of the first communicating portion of the shaft will be smaller than the pressure loss of the second communicating portion of the sleeve, overall.

(C)

In the first and second embodiments above, an example was given in which radial hydrodynamic grooves were formed in the outer peripheral surface of the shaft, and thrust hydrodynamic grooves were formed in the bottom surface of the shaft, but the present invention is not limited to this.

For instance, the radial hydrodynamic grooves may be formed on the inner peripheral surface of the sleeve, and the thrust hydrodynamic grooves may be formed on the flange cover. Also, the grooves may be formed on both faces, rather than on just one as above. Also, the radial hydrodynamic grooves may be one set.

(D)

In the first and second embodiments above, an example was given in which the stator 22 was disposed opposite the outer peripheral side of the rotor magnet 12, but the present invention is not limited to this. For instance, the stator may be disposed opposite the inner peripheral side of the rotor magnet, which is known as an outer rotor type of spindle motor. Also, a ring-shaped magnet and a coreless coil may be disposed opposite each other in the axial direction, which is known as a flat motor.

(E)

In the first and second embodiments above, the bubble suppression portion was provided to the bottom surface of the shaft, but the present invention is not limited to this.

Figure 18:
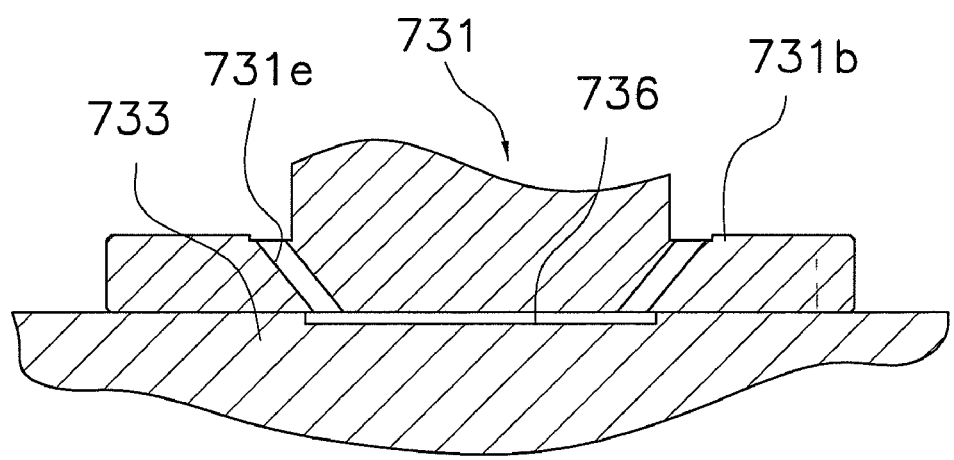
FIG. 18 is a detail cross section of the portion near the flange portion in the hydrodynamic bearing device pertaining to another embodiment of the present invention.

In FIG. 18, a bubble suppression portion 736 is formed on the face of a flange cover 733 that is opposite a shaft 731. Also, communicating holes 731*e* (an example of the first communicating portion) are formed going through from the upper surface of a flange portion 731*b* to the bottom surface of the flange portion 731*b* opposite the bubble suppression portion 736. In this embodiment the communicating holes 731*e* are formed aslant, but they may instead be formed in the axial direction.

(F)

In the first and second embodiments above, a description was added relating to a configuration in which the shaft rotates and the sleeve is sealed at one end, but the present invention is not limited to this.

For instance, the configuration may be one in which the shaft is fixed and the sleeve rotates. It should also go without saying that a configuration in which the sleeve is open at both ends and the upper and bottom surfaces of the shaft are fixed to a housing can also be used.

(G)

In the first and second embodiments above, an example was given in which the present invention was applied to the spindle motor 1, but the present invention is not limited to this.

Figure 19:
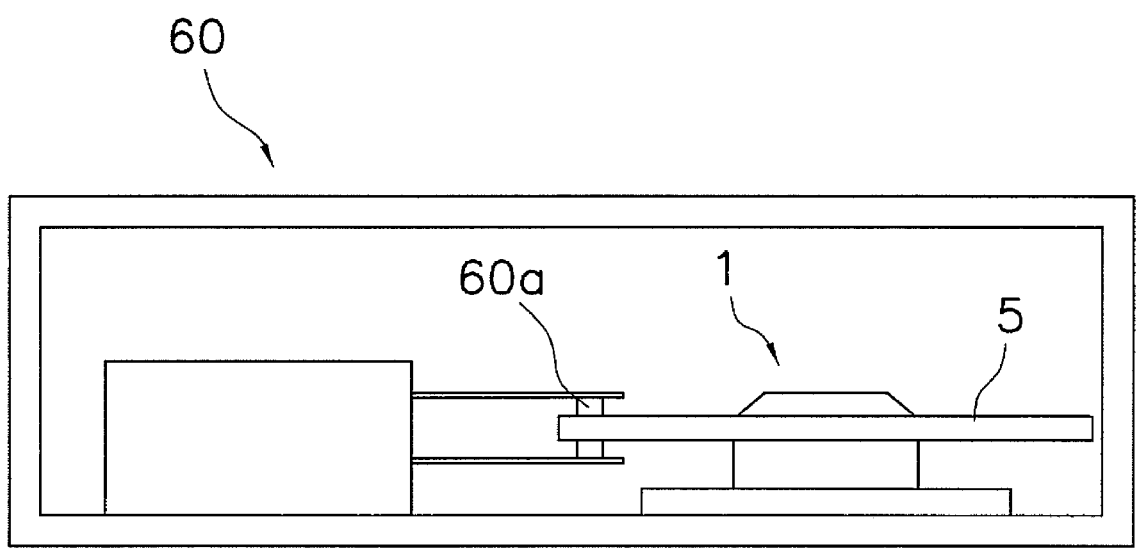
FIG. 19 is a cross section illustrating the configuration of a recording and reproducing apparatus pertaining to yet another embodiment of the present invention.

For instance, as shown in FIG. 19, the present invention can also be applied to a recording and reproducing apparatus 60 in which a spindle motor 1 having the above configuration is installed, and which reproduces information recorded to the recording disk 5, or records information to the recording disk 5, with a recording head 60*a* (an example of the information access means).

Therefore, it is possible to obtain a recording and reproducing apparatus that is compact and thin, and with which vibration resistance is ensured and the generation of noise can be suppressed even if the apparatus is used in situations where it may be subjected to strong vibration.

According to this invention, negative pressure is prevented from being generated in the bearing even when it is subjected to impact or vibration, and durability and reliability can be enhanced, as well as a spindle motor and a recording and reproducing apparatus equipped with this hydrodynamic bearing device.

The term "configured" as used herein to describe a component, section or part of a device includes hardware that is constructed to carry out the desired function.

Moreover, terms of degree such as "substantially", "somewhat", "approximately" and "roughly" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hydrodynamic bearing device, comprising:
   a sleeve having an insertion hole;
   a shaft disposed in said insertion hole of said sleeve so as to be capable of rotation relative to said sleeve, and having a main portion and a large diameter portion, said large diameter portion being disposed at an end of said main portion and having a diameter larger than a diameter of said main portion;
   a lubricating fluid held in a gap formed between said sleeve and said shaft;
   a bearing portion relatively rotatably supporting said sleeve and said shaft via said lubricating fluid;
   a flange cover fixed to said sleeve at a first end of said shaft in the axial direction of said shaft;
   a bubble suppression portion formed as a recess in at least one of said first end of said shaft and in said flange cover; and
   at least one first communicating portion communicating between said bubble suppression portion and a face of the large diameter portion that is not opposite the flange cover.

2. The hydrodynamic bearing device according to claim 1, wherein an equivalent diameter De2 in a radial cross section of said bubble suppression portion at a location that intersects the said at least one first communicating portion is greater than an equivalent diameter De1 in a cross section perpendicular to the direction in which said at least one first communicating portion extends,
   the equivalent diameter De1 is four times the quotient of dividing the cross sectional area A1 in a cross section perpendicular to the direction in which the first communicating portion extends by the peripheral length L1, and is expressed by the following relational formula (1), $$De1 = 4A1/L1 \quad (1), \text{ and}$$

the equivalent diameter De2 is four times the quotient of dividing the radial cross sectional area A2 of said bubble suppression portion at a radial location that intersects said at least one first communicating portion by the peripheral length L2, and is expressed by the following relational formula (2), $$De2 = 4A2/L2 \quad (2).$$

3. The hydrodynamic bearing device according to claim 1, wherein said bubble suppression portion is symmetrical around the rotational axis.

4. The hydrodynamic bearing device according to claim 1, wherein said at least one first communicating portion opens near an outer peripheral surface of said main portion.

5. The hydrodynamic bearing device according to claim 1, wherein said bubble suppression portion is formed at said first end of said shaft.

6. The hydrodynamic bearing device according to claim 1, wherein said large diameter portion is formed integrally with said main portion.

7. The hydrodynamic bearing device according to claim 1, wherein said large diameter portion is separate from said main portion and is fixed to said main portion.

8. A spindle motor, comprising:
   a stationary member having a base and a stator fixed to said base;
   a rotary member having a rotor magnet disposed opposite said stator and constituting a magnetic circuit along with said stator, and a hub that fixes said rotor magnet; and
   said hydrodynamic bearing device according to claim 1, said hydrodynamic bearing device being fixed to said base and supporting said rotary member so as to be rotatable with respect to said stationary member.

9. A recording and reproducing apparatus, comprising:
   said spindle motor according to claim 8; and
   an information access device configured to read or write information from or to a required location of a recording medium on which information can be recorded.

* * * * *